Figure 2:
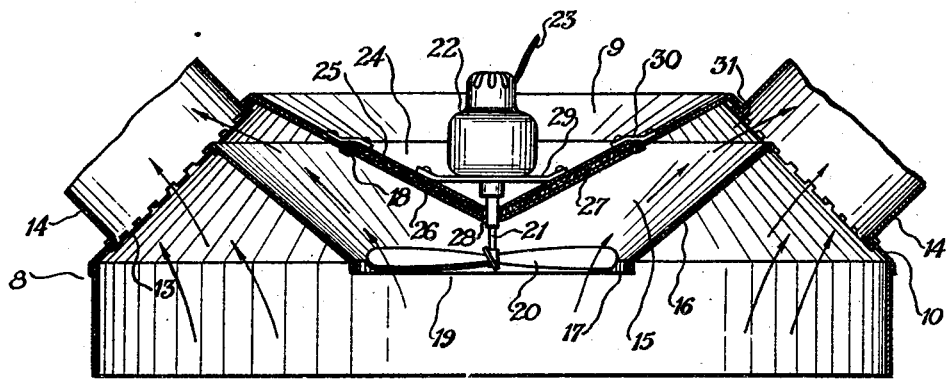

Jan. 27, 1931.   A. H. ROBINSON   1,790,021
HEATING APPARATUS
Filed Aug. 12, 1929

Inventor
Arthur H. Robinson
By Harry Fresse
Attorney

Patented Jan. 27, 1931

1,790,021

UNITED STATES PATENT OFFICE

ARTHUR H. ROBINSON, OF LAKEWOOD, OHIO, ASSIGNOR TO THE A. H. ROBINSON COMPANY, OF MASSILLON, OHIO, A CORPORATION OF OHIO

HEATING APPARATUS

Application filed August 12, 1929. Serial No. 385,095.

My invention relates to improvements in heating apparatus, and more particularly to means for positively and mechanically circulating and distributing hot air in connection with heating units or systems thereby producing what is known as "forced air heating". Moreover, my invention is an improvement upon my prior Patent No. 1,494,632 entitled "Heating apparatus", dated May 20, 1924.

The construction shown by my prior patent includes a hot air accumulating and distributing chamber having a mechanical air circulating device therein, the chamber being adapted for connection with distributing pipes or conduits and for connection with the bonnet of a furnace. With my prior construction, the accumulating and distributing chamber forms a distinct addition to the furnace whether the furnace is new or whether accumulating and distributing device is being provided for a furnace that has been in use.

An object of the present invention is therefore to provide an improved form and arrangement of a hot air accumulating and distributing chamber which may either be furnished directly as a part of a furnace, or which may readily be installed as an addition to a heating unit and system already in use; the hot air accumulating and distributing chamber including a mechanical air circulating device preferably of the motor driven blower type in which the motor is mounted exterior to the chamber and heat insulated therefrom.

A further object of the present invention is to provide a hot air accumulating and distributing chamber for a furnace having a relatively small number of parts which are inexpensive to manufacture, and which whether installed as a part of a furnace or as an addition to a heating system already in use, will not require any pipe fitting or sheet metal work to be performed upon the walls forming the hot air accumulating and distributing chamber, which does not have to be done in installing the furnace.

A still further object of the present invention is to provide a hot air accumulating and distributing chamber for a furnace which will automatically deliver the required amount of air for producing forced air heating regardless of the size of the hot air distributing pipes leading from the furnace bonnet, and without necessitating any changes or additions to be made to the hot air accumulating and distributing chamber unit.

Furthermore, in particular instances certain hot air distributing pipes do not require a forced draft for supplying the required amount of heat because of particular circumstances, and it is therefore a further object of the present invention to provide a construction in which a distributing pipe may be connected with the bonnet of the furnace in such a manner that the hot air accumulating and distributing chamber will not deliver forced air to the same.

And finally, it is an object of the present improvement to provide an air circulating device which will not in any way interfere with the ordinary gravity operation of the furnace and heating system when the device is not being used.

These and other objects may be obtained by a construction and arrangement, preferred embodiments of which will hereinafter be set forth in detail, and which may be stated in general terms as including a skirt extending from the side walls of a furnace bonnet and spaced from the top wall thereof, there being an opening in the skirt forming an inlet orifice, the skirt and bonnet walls forming a hot air accumulating and distributing chamber; a motor mounted exterior to the chamber and having operatively connected therewith an air circulating fan located within the chamber adjacent the opening in the skirt, the bonnet walls and skirt being so arranged that hot air distributing pipes or conduits may be led off from the bonnet walls in communication with the furnace chamber and hot air accumulating and distributing chamber or in communication with the furnace chamber alone.

Figure 1:
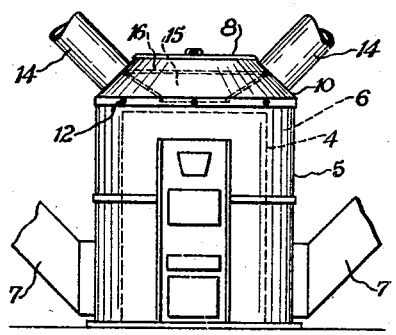

A preferred embodiment of the present invention is shown in the accompanying drawings forming a part hereof, in which Figure 1 is a side elevation of an ordinary hot air furnace unit or heating system equipped with the improved air circulating device; and Fig. 2, a longitudinal section through the upper portion of a furnace showing the bonnet walls thereof and showing the improved air circulating device.

Similar numerals of reference refer to corresponding parts throughout the several figures of the drawings.

The heating unit or furnace 4, may be of any suitable construction, and is surrounded by a suitable casing 5 which forms with the furnace, a hot air heating chamber 6 which may be supplied with air as by suitable cold air pipes 7, through which air to be heated may be conducted to the base portion of the heating chamber 6. The supply pipes or conduits 7 may communicate with any suitable source of air supply, as for example, fresh air taken in from the exterior of the building to be heated, or the pipes 7 may communicate with suitable return pipes leading from rooms heated by air distributed from the heating chamber.

The furnace may be provided with the usual bonnet generally indicated at 8 which may include a top wall 9 and a side wall 10. The bonnet 8 may be connected with the casing 5 of the furnace by means of the annular flange 11 extending downward from the side wall of the bonnet, bolts or rivets 12 securing the flange 11 to the casing 5.

For providing forced air heating and positive circulation and distribution of hot air through any or all of the distributing pipes 14, a hot air accumulating and distributing chamber generally indicated at 15 is formed in the furnace bonnet by providing a skirt 16 extending from the side wall 10 of the bonnet 8 and spaced from the bonnet top wall 9.

This skirt has formed therein preferably at its central portion an opening 17 forming an air inlet orifice to the hot air accumulating and distributing chamber 15.

Likewise an opening 18 is formed in the top wall of the furnace bonnet for inserting an air propelling device into the accumulating and distributing chamber and said air propelling device generally indicated at 19 may include a propeller blade fan or air propelling member 20 mounted on a suitable shaft 21 extending from the variable speed motor 22 which may be supplied with electric current as through the wires 23.

The motor and fan may be mounted on a suitable double mounting plate 24 which may include spaced walls 25 and 26 between which may be located suitable heat insulation 27. The shaft 21 extends through the opening 28 in the mounting plate 24 so that the motor is mounted on one side of the mounting plate as by mounting means 29 and the propeller fan 20 is extended on the other side of the mounting plate 24.

The mounting plate 24 may be connected with the top wall 9 of the furnace bonnet 8 by suitable clamps 30.

When the air propelling device 19 is thus mounted in connection with the furnace bonnet 8, the motor 22 is heat insulated from overheating, by the heat insulation 27, and the propeller fan 20 is located inside of the hot air accumulating and distributing chamber 15 adjacent the opening 17 forming the air inlet orifice therefor.

Under gravity operation, the heated air will flow as in the direction of the arrows shown in Fig. 2 and when it is desired to produce forced air heating, the variable speed motor 22 may be turned on to the desired speed, causing the propeller fan 20 to be rotated, which will draw air into the hot air accumulating and distributing chamber 15 through the opening 17, causing air pressure to be built up within the chamber 15, when the air is then discharged through any distributing pipe 14.

The heating apparatus shown in the drawing is adapted for delivering 800, 1350 or 1500 cubic feet of air per minute when the propeller fan is operating, depending upon the speed of the motor 22, and under these conditions it is desirable to space the skirt a distance of some three inches below the top wall 9 of the bonnet 8. When the device is delivering forced air heating at a rate of 1500 cubic feet of air per minute, the heating efficiency of the furnace is increased approximately 40% from the normal gravity operation of the furnace.

I claim:

1. In a heating apparatus, a furnace, a casing surrounding the same and forming a heating chamber, means for supplying air to be heated to said casing, a bonnet for the casing having a top wall and a side wall, a skirt extending from one of the walls and forming with the bonnet walls a hot air accumulating and distributing chamber, there being an opening in the skirt forming an air intake orifice for the chamber, means located inside the chamber adjacent the orifice for causing a circulation of air in and through said chamber, and hot air distributing pipes extending from said bonnet and communicating partially with said heating chamber and partially with said accumulating and distributing chamber.

2. In a heating apparatus, a furnace, a casing surrounding the same and forming a heating chamber, means for supplying air to be heated to said casing, a bonnet for the casing having a top wall and a side wall, there being openings formed in one of the bonnet walls, hot air distributing pipes extending from one of the bonnet walls and communicating with said openings, a skirt extending from one of the bonnet walls and cutting across said openings, the skirt and bonnet walls forming a hot air accumulating and distributing chamber, there being an opening in the skirt forming an air intake orifice for the chamber, and means located inside the chamber adjacent the orifice for causing a circulation of air in and through said chamber and out through said distributing pipes.

3. In a heating apparatus, a furnace, a casing surrounding the same and forming a heating chamber, means for supplying air to be heated to said casing, a bonnet for the casing having a top wall and a side wall, a skirt extending from one of the walls and forming with the bonnet walls a hot air accumulating and distributing chamber, there being an opening in the skirt forming an air intake orifice for the chamber, an air propelling member located inside the chamber adjacent the orifice for causing a circulation of air in and through said chamber, hot air distributing pipes extending from said bonnet and communicating partially with said heating chamber and partially with said accumulating and distributing chamber, and means located exteriorly of the chamber for driving said air propelling member.

In testimony that I claim the above, I have hereunto subscribed my name.

ARTHUR H. ROBINSON.